United States Patent Office 3,362,940
Patented Jan. 9, 1968

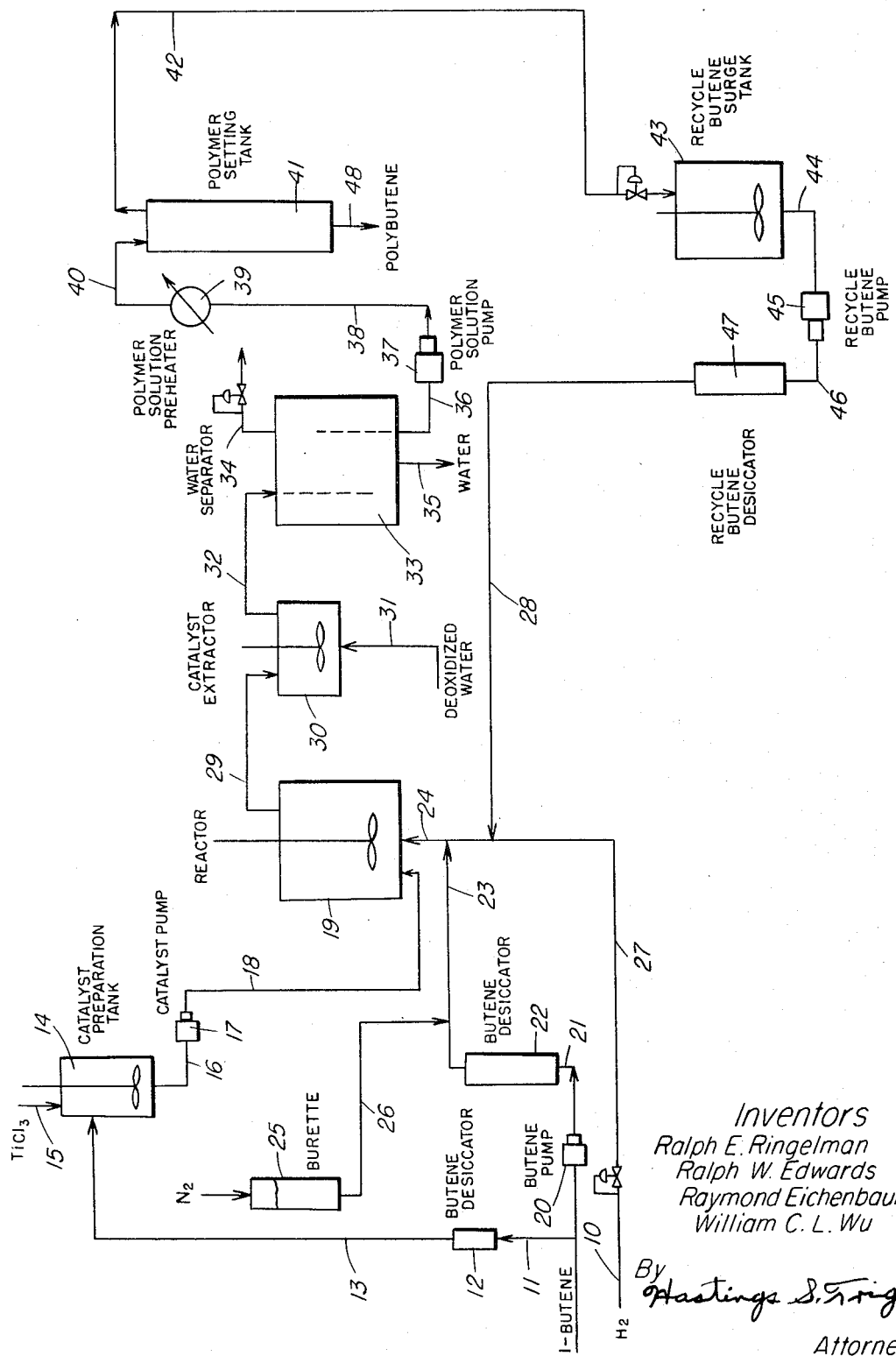

3,362,940
STEREOREGULAR POLYMERIZATION OF
1-OLEFINS IN MONOMER SOLUTION
Ralph W. Edwards and Alfred W. Francis, Metuchen, and Raymond Eichenbaum, Spotswood, N.J., Ralph E. Ringelman, Beaumont, Tex., and William C. L. Wu, Highland Park, N.J., assignors to Mobil Oil Corporation, a corporation of New York
Filed May 6, 1965, Ser. No. 453,599
17 Claims. (Cl. 260—88.2)

This application is a continuation-in-part of copending application Ser. No. 375,061, filed June 15, 1964, and now abandoned.

This invention is concerned with the polymerization of olefins to solid, crystalline polymers. It is more particularly concerned with a novel, improved process for carrying out the stereospecific polymerization of butene-1 and higher 1-olefins and copolymerization thereof with propylene and ethylene.

As is well known to those familiar with the art, highly tactic polymers of 1-olefins have been prepared in the presence of catalyst systems comprising (A) a compound of a transitional metal of Groups IV-A, V-A, VI-A, and VIII of the Periodic Arrangement of the Elements, wherein the metal is present in a valence state lower than its maximum, and (B) at least one organometallic compound of metals of Groups II and III of the Periodic Arrangement of the Elements. In order to facilitate stirring and heat removal during the polymerization reaction and to improve contact with the catalyst, such polymerizations have been carried out in the presence of inert diluents, such as gasoline, paraffin oil, hexane, heptane, benzene, and other hydrocarbons and mixtures thereof. In the case of polypropylene, it has been proposed to use liquid propylene as the diluent. In such polymerizations, the polymer, as it is formed, is dispersed in the diluent in the form of a slurry.

Polymerization processes utilizing the slurry technique, however, have certain disadvantages. The separation of polymer product, unreacted monomer, and inert diluent is, as is well known, an involved and relatively difficult procedure. Large amounts of diluent are used, which must be separated by filtration or decantation methods. It is not always easy to recover the diluent in a sufficiently pure state to permit its reuse. More significantly, as the polymer product is in the solid state, the removal of catalyst residues is extremely difficult. Resort has been had to various involved extraction techniques, such as with aqueous acid solutions or with chelating agents. Also, in many cases polymer yield (parts per part of catalyst) and degree of tacticity have been relatively low.

It has now been found that butene-1 and higher 1-olefins can be homopolymerized or copolymerized with propylene or ethylene, in high yields of polymer, usually having a high degree of tacticity, by a process which permits easy catalyst removal and product separation. It has been discovered that these advantages are achieved by using liquid butene-1 or higher monomer as a solvent in the polymerization process and by controlling conditions to maintain tactic polymer product in solution in said liquid monomer.

Throughout the specification and claims, the term "tactic" is a generic term applied to solid polymers in which there is an ordered structure with respect to the configurations around at least one main-chain site of steric isomerism per conventional base unit. Numerous types of tacticity are recognized in the art. Within the contemplation of this invention, a measure of steric order is the weight percent of the solid polymer that is insoluble in diethyl ether. A linear polymer that is insoluble in diethyl ether is considered to be tactic. Linear tactic polymers may be composed of isotactic or syndiotactic chains, blocks, or mixtures of these forms. The terms isotactic and syndiotactic are used in accordance with the definitions tentatively approved by Commission on Macromolecules of the International Union of Pure and Applied Chemistry, as outlined in the Journal of Polymer Science, volume 56, pages 153–161 (1962). Tactic polymers can contain sequences of atactic (i.e., not tactic) units in conjunction with tactic sequences and still be insoluble in diethyl ether. They are tactic polymers within the contemplation of this invention.

It is a broad object of this invention to provide a process for producing tactic polymers. Another object is to provide an improved method for polymerizing butene-1 and higher 1-olefins and for copolymerizing butene-1 or higher 1-olefin, as the main monomer, with propylene or ethylene to tactic polymers. A specific object is to provide a process for polymerizing butene-1 and higher 1-olefins and for copolymerizing butene 1 or higher 1-olefins, as the main monomer, with propylene or ethylene to obtain high yields of polymer having usually a high degree of tacticity. A more specific object is to provide a process for polymerizing butene-1 and higher 1-olefins and for copolymerizing butene-1 or higher 1-olefin, as the main monomer, with propylene or ethylene using liquid main monomer as a solvent, under conditions wherein tactic polymer product is maintained in solution in liquid main monomer. Other objects and advantages of this invention will become apparent to those skilled in the art from the following detailed description, considered in conjunction with the drawing which presents a schematic arrangement of a typical embodiment for carrying out the process of this invention in a continuous manner.

In general, this invention provides a method for producing tactic polymers of butene-1 and higher 1-olefins or tactic copolymers of butene-1 and higher 1-olefins with propylene or ethylene, which comprises contacting, in the liquid phase, a 1-olefin main monomer having 4 to 10 carbon atoms or a mixture of 1-olefin main monomer having 4 to 10 carbon atoms with up to 20 mole percent propylene or ethylene with a catalyst system comprising (A) a compound of a transitional metal of Groups IV-A, V-A, VI-A, and VII of the Periodic Arrangement of the Elements wherein the metal is present in a valence state lower than its maximum and (B) at least one organometallic compound of metals of Groups II and III of the Periodic Arrangement of the Elements under conditions whereby liquid main monomer is a true solvent for the polymer or copolymer as it forms. Thus, the amount of liquid 1-olefin main monomer used is in an excess, over the amount of 1-olefin that will react with the catalyst system to form tactic polymer, sufficient to form a solution of tactic polymer in 1-olefin main monomer having a concentration not greater than about 30 weight percent tactic polymer. The polymerization temperature used will be between the lower cloud point and the upper cloud point of the solution of tactic polymer in its liquid monomer.

In other embodiments of this invention small amounts of hydrogen can be employed, in order to control molecular weight of the polymer and to increase catalyst activity; and catalyst components can be removed from the solution of polymer in liquid monomer by liquid-liquid extraction with de-oxygenated water.

The 1-olefin main monomer that is polymerized by the process of this invention is a 1-olefin having between 4 and 10 carbon atoms, inclusive. It has the structure, $CH_2=CHR$, wherein R is an alkyl radical having between 2 and 8 carbon atoms. Non-limiting examples of the 1-olefin reactant include butene-1; pentene-1; 3-methylbutene-1; hexene-1; 3-methylpentene-1; 4-methylpentene-1;

heptene-1; 4-methylhexene-1; octene-1, nonene-1; and decene-1. Preferably, the 1-olefin should be substantially pure (free of acetylene, oxygenated, or sulfur containing compounds). Also, the 1-olefin should be dry and oxygen free.

It is also within the contemplation of this invention to produce copolymers of a 1-olefin main monomer having between 4 and 10 carbon atoms with propylene or ethylene, in solution in the liquid main monomer. Thus, by way of non-limiting examples, there can be produced copolymers of butene-1 and ethylene, butene-1 and propylene, 3-methylbutene-1 and propylene, 3-methylpentene-1 and ethylene, 3-methylpentene-1 and propylene, 4-methylhexene-1 and ethylene, and nonene-1 and propylene. In general, amount of comonomer in the feed will be up to about 20 mole percent. When the amount of propylene or ethylene in the comonomer feed exceeds about 20 mole percent, the coplymer has a significantly reduced tacticity. Due to the greater polymerization rate of ethylene, however, it is preferred to use no more than about 10 mole percent ethylene comonomer.

The catalyst system utilized in making the polymers in accordance with this invention is composed of at least two components, one being a compound of a transitional metal of Groups IV-A, V-A, VI-A and VIII of the Periodic Arrangement of the Elements in a reduced valence state, and the other being an organometallic compound of a metal of Groups II and III of the Periodic Arrangement of the Elements. The Periodic Arrangement of the Elements, as referred to herein, is that published in the Journal of Chemical Education, volume 16, page 409 (1939).

Among the reducible transitional metal compounds suitable for the purposes of this invention are the heavy metal, inorganic compounds such as halide, oxyhalides, complex halides, hydroxides, and organic compounds such as alcoholates, acetates, benzoates, and acetyl acetonates, of the metals of Groups IV-A, P-A, PI-A, and PIII of the Periodic Arrangement of the Elements. Such metals include titanium, zirconium, hafnium, thorium, uranium, vanadium, niobium, tantalum, chromium, molybdenum, tungsten and iron. The metal halides, particularly the chlorides are generally preferred. Titanium, zirconium, and vanadium are the most active metals. The following heavy metal compounds are readily reducible: titanium tetrachloride, titanium tetrabromide, zirconium tetrachloride, vanadium tetrachloride, and zorconium acetylacetonate.

These transitional metal compounds can be reduced to valence states lower than maximum valence by a number of ways well known in the art. As exemplified by titanium tetrachloride, it can be reduced to titanium trichloride and/or dichloride by hydrogen to a brown amorphous substance, which is converted into the violet crystalline form by heating at an elevated temperature in the order of 200° C. The reduction can be accomplished by heating titanium tetrachloride with metallic titanium or aluminum under pressure. This reduction can also be promoted by Friedel-Crafts halides. In the case of the aluminum reduction, the product will comprise reduced titanium chloride and aluminum trichloride. The reduction can also be effected by an organo-metallic compound of Group II or III to produce a crystalline titanium halide in a valence state lower than maximum. Suitable materials for this reduction are trialkyl aluminum and dialkyl aluminum halides. In practicing the present invention, the particular method of obtaining the transitional metal compound of reduced valance state is not pertinent. Indeed many reduced compounds contemplated herein are commercially available.

The other component of the catalyst system is at least one organometallic compound of a metal of Groups II and III. These compounds will have at least one hydrocarbon radical, i.e., alkyl, cycloalkyl, aralkyl, alkaryl, or aryl, attached to the metal through a carbon atom. The other substituents in the organometallic compound can be hydrocarbon radicals, halogen radicals, alkoxy, amino, hydrogen, etc., or combinations thereof. Non-limiting examples of the organometallic compounds are triethylaluminum, tripropylaluminum, dipropylzinc, triisobutylaluminum, diethylmagnesium, diphenylaluminum chloride, cyclohexyl-ethylzinc, diethylaluminum bromide, diethylaluminum chloride, diethylaluminum iodide, ethylzinc chloride, propylmagnesium chloride, dipropylaluminum chloride, dioctylaluminum chloride, diisobutylaluminum hydride, phenylaluminum dihydride, cyclohexylbromo aluminum hydride, dipropylaluminum hydride, propyl zinc hydride, ethylmagnesium hydride, and methoxyaluminum diethyl. Mixtures of two or more organometallic compounds can be used. A preferred mixture is diethylaluminum chloride and diethylaluminum iodide, usually in a ratio of about 80 mole percent chloride and 20 mole percent iodide.

For the purpose of modifying catalyst and polymer characteristics, if desired, minor amounts of a third component can be used with the catalyst system of reduced transitional metal compound and organometallic compound. Such materials are well known to those familiar with the art and include carbides, acetylides, organophosphorus compounds, and Lewis bases.

In activating the reduced transitional metal compound (e.g. $TiCl_3$) with an organometallic compound (e.g. diethylaluminum chloride) various ratios can be used. Thus, the molar ratio of these two components (e.g. Al/Ti) can range from 0.5 to 6 moles of organometallic compound per mole of reduced transitional metal compound. A ratio of about 2:1 to 4:1 is preferred.

The catalyst system of reduced transitional metal compound and organometallic compound can be formed in several ways known in the art. Particularly in batch operation, the catalyst can be formed by separately charging the catalyst components to the polymerization reaction zone, in the proper ratio, so that they are combined in the reaction zone or just prior to their entry therein. The reduced transitional metal compound is suitably charged as a slurry in liquid monomer. As the organometallic compound is usually liquid, a solvent need not be employed.

It is an important feature of the process of this invention that it is carried out using liquid 1-olefin main monomer as a true solvent. Under the operating conditions of the process, the tactic poly-1-olefin product dissolves in the monomer, or in the main monomer in the case of copolymers.

As is well known in the art, the yield of tactic polymer (i.e., homopolymer or copolymer) is dependent, in part, upon the catalyst and varies with the catalyst system and the conditions. Such yield for a given catalyst and polymerization conditions is readily determinable by those skilled in the art. It is usually expressed as parts tactic polymer produced per part reduced transitional metal compound.

In order to maintain the solution of polymer in main monomer, there must be present sufficient excess liquid main monomer over that which can enter into the polymerization reaction. Generally, the concentration of tactic polymer in the liquid main monomer should not exceed about 30 weight percent, because at higher concentrations efficient agitation and handling become extremely difficult. In preferred practice, the concentration of tactic polymer in liquid main monomer will be between about 12 weight percent and about 18 weight percent. In order to maintain a selected concentration of polymer in 1-olefin main monomer, the ratio of monomer to catalyst can vary over a wide range dependent upon the catalyst activity and the reaction conditions employed. Accordingly, there can be charged to the polymerization reaction between about 400 parts and about 36,000 parts or more main 1-olefin per part of reduced transitional metal compound; all parts being by weight. Particularly in the case of a continuous process, the ratio can be determined in accordance with the formula:

$$\text{Ratio} = \frac{Fm}{Fc} = \frac{R \times a}{Cp}$$

wherein $Fm$ is the monomer flow rate, $Fc$ is the catalyst flow rate, $R$ is the residence time, $a$ is the catalyst activity, and $Cp$ is the desired polymer concentration.

A solution of a tactic homopolymer of butene-1 and higher 1-olefins or of a tactic copolymer of butene-1 or higher 1-olefin, as the main monomer, with propylene or ethylene as hereinbefore defined in liquid $C_4$–$C_{10}$ 1-olefin main monomer exhibits a phenomenon of having two cloud points. As the solution is cooled, a temperature will be reached at which solid polymer will come out of solution. This temperature is called the lower cloud point. On the other hand, as the solution is heated a temperature will be reached at which there will form a polymer-rich phase and a polymer-lean phase. This temperature is called the upper cloud point. At temperatures between the two cloud points there will exist a homogeneous solution of polymer in main monomer. Accordingly, the polymerization process of this invention must be operated at temperatures between the lower cloud point and the upper cloud point of the solution of tactic polymer in its liquid olefin monomer. The cloud points for a given poly-1-olefin in its liquid monomer can be readily determined by those skilled in the art by well-known methods. In the case of polybutene-1, the polymerization process will be operated at temperatures between about 110° F. and about 195° F. In preferred practice the process is operated at about 150° F.

As has been indicated hereinbefore, the process of this invention is carried out in the liquid phase. Accordingly, depending upon the operating temperature, there must be employed sufficient pressure to maintain the main 1-olefin in the liquid phase. For each 1-olefin, the required pressure at the operating temperature can be determined by means of vapor pressure-temperature relationship curves, such as by the Cox Chart Method [Ind. Eng. Chem., 15, 592 (1923)].

It will be desirable in many cases to regulate the polymerization reaction, in order to control the molecular weight of the polymer product. To some extent this can be done by adjusting process variables of temperature, contact time, catalyst concentration, etc., as is well known in the art. A more feasible method is to add minor amounts of hydrogen to the reaction to reduce molecular weight. The amount of hydrogen used can range from none up to about 0.1 mole percent, based on 1-olefin charge.

In general, the residence time of 1-olefin reactant and catalyst system in the polymerization reactor will be between about 0.5 hour and about 10 hours. Preferably it will be about 3 hours.

Upon completion of the polymerization reaction, the catalyst can be deactivated and removed by any of the techniques and manipulations well known in the art, such as by treating with an alcohol or an alcoholic solution of mineral acid. Because, however, the polymer is in solution in the process of this invention, the catalyst can be most feasibly deactivated and substantially completely removed by aqueous washing of the solution of polymer in liquid monomer. The polymer is maintained in solution within the ranges of temperature and pressure used in the reactor, as set forth hereinbefore. Suitably, substantially the same temperature and pressure employed in the polymerization reaction can be used, although higher temperatures, up to the upper cloud point, and correspondingly higher pressure can be used. In practice, the wash water is demineralized and deoxygenated (to avoid oxidation of catalyst). If desired, acidic or basic compounds, or chelating agents can be added thereto. The reduced transitional metal compound and reaction products of the organometallic compounds will remain virtually completely with the aqueous phase. The amount of aqueous wash employed can vary between about 0.01 volume and about 5 volumes per volume polymer solution. Usually, about 0.5–2.0 volume ratio is preferred.

If it is desired, the washed polymer solution can be treated by contact with absorbents, such as alumina. Such treatment serves to dry the polymer solution and to remove residual traces of catalyst residues and of acidic catalyst decomposition products. In the usual practice of the process of this invention, however, such treatment is not necessary, because satisfactory catalyst removal is ordinarily effected by aqueous washing alone.

After catalyst components have been removed, the tactic polymer product is separated. This can be done in several ways. In one procedure, the pressure is reduced and 1-olefin monomer is flashed off or distilled out, leaving the tactic polymer. This procedure, however, would involve handling relatively large quantities of monomer. Another method would involve maintaining liquid phase and cooling the solution of polymer to precipitate the polymer therefrom. It can then be separated by filtration.

A particularly feasible method for separating the polymer product is the claimed subject matter of a copending application Ser. No. 375,287, filed June 15, 1964. As has been mentioned hereinbefore, the solution of the polymer in its liquid monomer exhibits two cloud points. Thus, the solution is heated to a temperature above the upper cloud point, with a corresponding increase in pressure sufficient to maintain liquid phase. In order to obtain the benefit of decreased viscosity and the resultant ease in handling, it is desirable to use as high a temperature as possible. This can be any temperature above the upper cloud point and up to the critical temperature of the 1-olefin solvent. In the case of butene-1, therefore, the solution of polybutene-1 in liquid butene-1 is heated to a temperature between about 195° F. and about 294° F. A suitable temperature is about 260° F.

When the solution of polymer in its monomer is heated above the upper cloud point, as aforedescribed, there occurs a separation into two distinct liquid phases. The lighter phase is a polymer-lean phase which comprises liquid 1-olefin containing small amounts of polymer. The amount of polymer in the polymer-lean phase usually is less than one percent. It is largely composed of atactic polymer and low molecular weight tactic polymer.

The heavier phase is a polymer-rich phase, i.e. liquid monomer containing polymer in large amounts. In the case of butene-1, the concentration of polybutene-1 in liquid butene-1 in the polymer-rich phase will be in the order of about 50 weight percent. This phase can be readily separated and treated to recover the polymer product. Feasibly, this can be done by flashing off or distilling out the 1-olefin monomer. Another modification is to heat the separated polymer-rich phase to a temperature above the critical temperature of the monomer and to flash off the monomer, thus obtaining molten polymer product. This molten product can be fed directly to a hot melt extruder.

This method of separation has the advantage of reducing catalyst residue in the finished polymer to a low level. Upon heating the washed polymer solution to obtain two phases, if any trace amounts of catalyst residue remains in the washed solution, it will be approximately equally divided between the polymer-rich phase and the polymer-lean phase. Accordingly, residual catalyst residue remaining after washing will be reduced by 50 percent in the final polymer.

The polymer-lean phase will contain small amounts of water and minor amounts of water-soluble decomposition products of the catalyst. This phase can be treated in various ways to recover pure 1-olefin monomer for recycling to the polymerization. For example, the polymer-lean phase can be cooled to a temperature approaching ambient temperature, being maintained under pressure sufficient to maintain liquid phase. This cooled phase can be water-washed to remove residual catalyst decomposition products and dried by contact with a suitable solid drying agent. Then, the 1-olefin monomer can be flashed or distilled off to recover reuseable, pure 1-olefin.

In the examples and tables, the degree of tacticity of polymer product is measured as Isotactic Index (I.I.), i.e., the weight percent of polymer insoluble in diethyl ether. The Melt Index (M.I.) is determined in accordance with ASTM Designation: D–1238–62T, using condition "L." The Reduced Specific Viscosity (R.S.V.) is determined in accordance with ASTM Designation: 1601–61, and is the Specific Viscosity (Relative Solution Viscosity–1) divided by the concentration of polymer in Decalin.

The process of this invention can be carried out batchwise. It is, however, particularly adapted to continuous processing. Referring to the drawing, there is set forth a typical schematic arrangement for carrying out the process on a continuous basis. In the following example, there is described a continuous process specifically directed to the polymerization of butene-1. It will be recognized, however, that other 1-olefins, as hereinbefore disclosed, can be polymerized in a similar manner.

*Example 1*

In a typical continuous process schematically shown in the drawing, liquid butene-1 is introduced through a line 10. A portion of the liquid butene-1 was passed through line 11 and a desiccator or dryer 12, containing 3 A. pore size synthetic Zeolite A (described in U.S. Patent No. 2,882,243). The desiccated liquid butene-1 was then passed through a line 13 into a catalyst preparation tank 14. Titanium trichloride in finely divided form was introduced through a line 15 into the catalyst preparation tank, wherein it was admixed with liquid butene-1 to form a slurry therein. The slurry of titanium trichloride in liquid butene-1 was removed from the tank 14 through a line 16 and pumped by a pump 17 through a line 18 into a polymerization reactor 19, at a feed rate of 1.33 g., titanium trichloride per hour.

The remainder of the liquid butene-1 introduced through line 10 was pumped by pump 20 through a line 21 into a butene desiccator or dryer 22. The dryer 22 contained Zeolite A, as aforedescribed. The dried liquid butene-1 was passed through lines 23 and 24 into the reactor 19. The total charge rate of liquid butene-1 was 30 pounds per hour. Diethylaluminum chloride (25% solution in heptane) was charged from a burette 25 and through line 26 into line 23. In line 23 the diethylaluminum chloride was commingled with the liquid butene-1 and charged to the reactor 19 through line 24 as a rate of 8.8 milliliters diethylaluminum chloride per hour. Hydrogen was charged through a line 27 and line 24 into the reactor 19 at a rate of 3.67 s.c.f.h. Recycle liquid butene-1 was charged into lines 27 and 24 through a line 28.

In the reactor 19, polymerization of butene-1 was effected at a temperature of 150° F. and under a pressure of 120 p.s.i.g. The average residence time in the reactor was 1.7 hrs.

The effluent from the reactor, comprising polybutene-1 dissolved in liquid butene-1, catalyst and hydrogen, flowed from the reactor 19 through a line 29 into a catalyst extraction zone 30. The catalyst extraction zone was operated at a temperature of 164° F. Deoxygenated water was introduced through a line 31 into the catalyst extraction zone 30 at a rate of 13.2 pounds per hour. In the extraction zone 30, the water was intimately mixed with the effluent from the reactor 19, in order to extract the catalyst therefrom.

The effluent from the extraction zone 30, comprising water containing catalyst decomposition products, polybutene-1 dissolved in butene-1, and hydrogen, was transferred from the extraction zone 30 through a line 32 into a water separation zone 33.

In the water separation zone 33, the solution of polybutene-1 in liquid butene-1 separated into an upper phase and the water containing catalyst decomposition products settled as the lower phase. Inerts and hydrogen were removed through a line 34. The lower, aqueous phase was continuously removed through a line 35. The solution of polybutene-1 was removed through a line 36 and pumped by a pump 37 through a line 38 into a preheater 39. In the preheater 39, the solution of polybutene-1 in liquid butene was heated to a temperature of 265° F. and the pressure was increased to 490 p.s.i.g. The heated solution was then transferred from the preheater through a line 40 into a polymer settling tank 41.

In the polymer settling tank 41, two phases separated. The upper, lighter phase comprised a polymer-lean solution, i.e., about 1 weight percent low molecular weight and atactic polybutene-1 in liquid butene-1. This polymer-lean phase was removed through a line 42 and flashed in a surge tank 43.

The lower layer in the polymer settling mark 41 comprised about a 50 weight percent solution of tactic polybutene-1 in liquid butene-1. This solution was removed through a line 48. The solution withdrawn through line 48 was passed into a depressurizing zone, not shown, wherein butene-1 was flashed off to obtain tactic polybutene-1 product.

In this continuous operation the catalyst productivity was 680 pounds of polymer per pound of titanium trichloride. The average isotactic index was about 90% and the melt index varied between 0.25 and 0.33. Catalyst residues analyzed to about 7 p.p.m. titanium, 33 p.p.m. aluminum, and 39 p.p.m. chloride.

It will be evident from the foregoing example that the use of 1-olefin monomer as the solvent simplifies the overall process and facilitates handling of the product during the separation steps. There is an additional advantage in the use of liquid monomer solvent as compared to the same process wherein inert diluents are used. This is a marked increase in polymer yield per unit of catalyst. The following examples illustrate this.

*Example 2*

A batch autoclave run was made to polymerize butene-1 in heptane diluent. There were charged to the autoclave 362 g. butene-1 and 1002 g. of heptane. The catalyst system was 1 g. titanium trichloride with diethylaluminum chloride, in an aluminum to titanium molar ratio of 2. The polymerization reaction was carried out for 60 min. at 170° F. There were obtained 27 g. of polybutene-1 having an isotactic index of 64, an R.S.V. of 3.3, and a M.I. of 0.13.

*Example 3*

A similar run was made to polymerize butene-1 using liquid butene-1 as the solvent. There was charged to the autoclave 1425 g. butene-1. The catalyst was 1 g. titanium trichloride with diethylaluminum chloride in an aluminum to titanium molar ratio of 2.5. The polymerization reaction was carried out for 60 min. at 165° F. There were obtained 53 g. polybutene-1 having an isotactic index of 86, an R.S.V. of 5.1, and a M.I. of 0.1.

As has been mentioned hereinbefore, hydrogen can be used in the process of this invention to control molecular weight, as indicated by the reduced specific viscosity of the polymer. The use of hydrogen, however, has shown unexpected advantages of increasing yield and isotactic index. This is demonstrated in the following examples.

*Example 4*

A batch autoclave run was made to polymerize butene-1 in liquid butene-1 at 130° F. The catalyst system was 1 g. titanium trichloride with diethylaluminum chloride in an aluminum to titanium molar ratio of 2.5. After 30 min. of polymerization there were obtained 75 g. of polybutene-1. This polymer had an isotactic index of 87 and an R.S.V. of 8.0.

Example 5

Another run was carried out identical to that described in Example 4 with the exception that 38 millimoles of hydrogen were also charged to the autoclave. The yield of polymer was 142 g. and it had an isotactic index of 93 and an R.S.V. of 4.5.

As was noted in the run described in Example 1, washing the reactor effluent with deoxygenated water effectively reduces the amount of catalyst residue in the polymer. Generally this treatment alone is sufficient, except for cases in which a product of very high purity is desired. Such a product can be achieved by additional absorption as illustrated in the following example.

Example 6

In a run carried out as described in Example 1 two catalyst removal techniques were used. In one case, the reactor effluent was water extracted. In a second case the polymer solution was water extracted and then contacted with activated alumina absorbent. The comparative catalyst residue in the polymer product in each case was as follows:

|  | Catalyst Residues, p.p.m. | | |
| --- | --- | --- | --- |
|  | Ti | Al | Cl |
| Water extraction only | 1 | (¹) | 39 |
| Water extraction plus adsorption (adsorbent: Activated alumina F1) | 1 |  | (¹) |

¹ Non-detectable.

When using a dialkylaluminum halide as the co-catalyst in polymerization runs, it has been found advantageous to use mixtures of halides instead of the one alone. The advantages in using such mixtures are increased isotactic index, high activity, and lower molecular weight. As is demonstrated in the following examples, varying molar ratio of halides in such mixtures permits control of polymer properties without changing any variable in the process except the co-catalyst composition.

Examples 7-11

A series of runs was carried out in the autoclave as described in Example 3. In each run there was used diethylaluminum iodide and diethylaluminum chloride in varying molar ratios. The molar ratio in each run and yield and pertinent properties of the polymer product are set forth in the following Table I.

As has been indicated hereinbefore, the process of this invention can be used to prepare copolymers of butene-1 and higher 1-olefins with propylene or ethylene, charging up to 20 mole percent propylene or ethylene. The following examples demonstrate such operation, using mixtures of butene-1 and propylene for illustrative purposes.

Examples 12-14

Three autoclave runs were made, using mixtures of butene-1 and propylene. In each run, the amount of propylene charges was varied. Each run was carried out using a 1500 ml. charge of liquid butene-1/propylene with 0.5 g. $TiCl_3$ and 3.85 ml. diethylaluminum chloride, affording an Al/Ti mole ratio of 2.2. The runs were carried out at 150° F. (66° C.) for one hour, in the presence of 40 millimoles $H_2$. Pertinent data and results are set forth in Table II.

TABLE II

| Example | Charge Composition, Mole Percent | | Percent Conv. | Activity | I.I. | R.S.V. | M.I. |
| --- | --- | --- | --- | --- | --- | --- | --- |
|  | 1-butene | Propene |  |  |  |  |  |
| 12 | 94.4 | 5.6 | 16.0 | 282 | 86.0 | 3.2 | 0.68 |
| 13 | 87.0 | 13.0 | 17.2 | 308 | 81.0 | 2.8 | 0.65 |
| 14 | 69.7 | 30.3 | 16.3 | 314 | 29.6 | 2.4 | 1.50 |

From the data in Table II it will be apparent that copolymers can be made by the process of this invention. The amount of copolymer formed (percent conversion) is within the range of solubility in liquid butene-1, as set forth hereinbefore. By comparing Examples 13 and 14, it will be noted that, using more than 30 mole percent propylene in the charge, results in a product of undesirably low crystallinity, as measured by I.I.

Example 15

A run was carried out as described in Example I, using a charge of butene-1 and ethylene. This run was carried out at a temperature of 150° F. using a butene-1 flow rate of 30 pounds per hour and an ethylene flow rate of 1.25 to 5.1 standard cubic feet per hour. The catalyst was titanium trichloride promoted with 80 mole percent diethylaluminum chloride and 20 mole percent diethylaluminum iodide. The aluminum to titanium molar ratio was 3 and the residence time 4.4 hours. The copolymer produced exhibited the following methylene group absorption:

| Ethylene flow (s.c.f.h.): | Methylene group absorption (IR) |
| --- | --- |
| 1.25 | 0.008 |
| 3.4 | 0.020 |
| 5.1 | 0.027 |

Although the present invention has been described with preferred embodiments, it is to be understood that modifications and variations may be resorted to, without departing from the spirit and scope of this invention, as those skilled in the art will readily understand. Such

TABLE I

| Example | Mole Percent $Et_2AlI$ | Mole Percent $Et_2AlCl$ | Activity | I.I. | R.S.V. | M.I. |
| --- | --- | --- | --- | --- | --- | --- |
| 7 | 0 | 100 | 532 | 84.8 | 2.52 | 0.68 |
| 8 | 10 | 90 | 366 | 85.1 | 1.69 | 1.90 |
| 9 | 20 | 80 | 362 | 91.9 | 1.79 | 1.66 |
| 10 | 33.33 | 66.66 | 335 | 93.2 | 1.61 | 2.83 |
| 11 | 100 | 0 | 116 | 94.3 | 1.87 | 2.41 |

What is claimed:

1. A process for producing a tactic homopolymer that comprises:

contacting, in the liquid phase, a 1-olefin monomer having 4 to 10 carbon atoms with a catalyst system comprising component A, a compound of a transitional metal of groups IV–A, V–A, VI–A, and VIII of the Periodic Arrangement of the Elements wherein the metal is in a valence state lower than its maximum, and at least one component B, organometallic compound of metals of Groups II and III of the Periodic Arrangement of the Elements;

the amount of 1-olefin used being in an excess, over the amount of 1-olefin that will react with the catalyst system to form tactic polymer, sufficient to form a solution of the tactic polymer in the liquid 1-olefin monomer having a concentration not greater than about 30 weight percent tactic polymer;

and the polymerization temperature being between the lower cloud point and the upper cloud point of said solution of tactic polymer in its liquid monomer.

2. The process of claim 1, wherein up to 0.1 mole percent hydrogen, based upon 1-olefin charge, is charged to the process to control the molecular weight of the tactic polymer.

3. A continuous process for producing a tactic homopolymer, that comprises:

continuously introducing into a polymerization reaction zone a liquid 1-olefin monomer having 4 to 10 carbon atoms and a catalyst system comprising component A, a compound of a transitional metal of Groups IV–A, V–A, VI–A and VIII of the Periodic Arrangement of the Elements wherein the metal is in a valence state lower than its maximum, and at least one component B, organometallic compound of metals of Groups II and III of the Periodic Arrangement of the Elements;

the amount of 1-olefins introduced being in an excess, over the amount of 1-olefin that will react with the catalyst system to form tactic polymer, sufficient to form a solution of the tactic polymer in the liquid 1-olefin monomer having a concentration not greater than about 30 weight percent tactic polymer;

polymerizing a portion of the 1-olefin introduced to tactic polymer at a temperature between the lower cloud point and the upper cloud point of said solution of tactic polymer in its liquid monomer and at a pressure sufficient to maintain liquid phase;

continuously withdrawing from the polymerization reacton zone an effluent comprising a solution of tactic polymer in its liquid monomer and catalyst;

removing catalyst from the solution of tactic polymer in its liquid monomer;

separating tactic polymer from its monomer;

and recycling liquid monomer to the polymerization reaction zone.

4. The process of claim 3, wherein up to about 0.1 mole percent hydrogen, based upon 1-olefin charge, is charged to the polymerization reaction zone to control the molecular weight of the tactic polymer.

5. The process of claim 1, wherein said component A is a titanium halide and said component B s at least one aluminum alkyl.

6. The process of claim 5, wherein said 1-olefin is butene-1.

7. A process for producing tactic polybutene-1 that comprises:

contacting, in the liquid phase, butene-1 with a catalyst system comprising a titanium halide having a titanium valence below 4 and at least one aluminum alkyl, wherein the Al/Ti molar ratio is between 0.5 and 6, at a temperature between about 110° F. and about 195° F., for a residence time of between about 0.5 hour and about 10 hours, and at a pressure to maintain liquid phase thereby forming tactic polybutene-1 in solution in liquid butene-1;

the amount of butene-1 used being sufficient to form a solution of between about 12 and about 18 weight percent tactic polybutene-1 in liquid butene-1 and being between about 400 parts and about 36,000 parts by weight per part by weight of titanium halide, as determined by the formula $$\frac{Fm}{Fc} = \frac{R \times a}{Cp}$$

wherein $Fm$ is amount of butene-1 used, $Fc$ is the amount of titanium halide used, $R$ is the residence time, $a$ is the catalyst activity, and $Cp$ is the concentration of polybutene-1.

8. A continuous process for producing tactic polybutene-1 that comprises:

continuously introducing into a polymerization reaction zone liquid butene-1 and a catalyst system comprising a titanium halide having a titanium valence below 4 and at least one aluminum alkyl, wherein the Al/Ti molar ratio is between 0.5 and 6;

effecting polymerization in the polymerization reaction zone at a temperature between about 110° F. and about 195° F., for a residence time of between about 0.5 hour and about 10 hours, and at a pressure to maintain liquid phase, thereby forming tactic polybutene-1 in solution in liquid butene-1;

the amount of butene-1 charged being sufficient to form a solution of between about 12 and about 18 weight percent tactic polybutene-1 in liquid butene-1 and being between about 400 parts and 36,000 parts by weight per part by weight of titanium halide, as determined by the formula $$\frac{Fm}{Fc} = \frac{R \times a}{Cp}$$

wherein $Fm$ is the butene-1 flow rate, $Fc$ is the titanium halide flow rate, $R$ is the residence time, $a$ is the catalyst activity, and $Cp$ is the concentration of polybutene-1;

continuously withdrawing from said polymerization reaction zone an effluent comprising a solution of tactic polybutene-1 in liquid butene-1 and catalyst;

removing catalyst from the solution of tactic polybutene-1 in liquid butene-1 by washing with deoxygenated water;

separating tactic polybutene-1 from butene-1; and recycling butene-1 to the polymerization reaction zone.

9. The process of claim 7, wherein said titanium halide is titanium trichloride and said aluminum alkyl is diethylaluminum chloride.

10. The process of claim 7, wherein said titanium halide is titanium trichloride and said aluminum alkyl is a mixture of diethylaluminum chloride and diethylaluminum iodide.

11. The process of claim 8, wherein said titanium halide is titanium trichloride and said aluminum alkyl is diethylaluminum chloride.

12. A process for producing a tactic copolymer that comprises:

contacting, in the liquid phase, a 1-olefin main monomer having 4 to 10 carbon atoms admixed with up to 20 mole percent of comonomer selected from the group consisting of propylene and ethylene, with a catalyst system comprising component A, a compound of a transitional metal of Groups IV–A, V–A, VI–A and VIII of the Periodic Arrangement of the Elements wherein the metal is in a valence state lower than its maximum, and at least one component B, organometallic compound of metals of Groups II and III of the Periodic Arrangement of the Elements;

the amount of 1-olefin main monomer being in excess, over the amount of 1-olefin main monomer that will react with the catalyst system to form tactic copolymer, sufficient to form a solution of tactic copolymer in the liquid 1-olefin main monomer having a concentration not greater than about 30 weight percent tactic copolymer;

and the polymerization temperature being between the lower cloud point and the upper cloud point of said tactic copolymer in said liquid 1-olefin main monomer.

13. The process of claim 12, wherein said component A is titanium halide and said component B is at least one aluminum alkyl.

14. The process of claim 13, wherein said 1-olefin main monomer is butene-1 and said comonomer is propylene.

15. The process of claim 12, wherein said 1-olefin main monomer is butene-1, said comonomer is propylene, said component A is titanium trichloride, and said component B is diethylaluminum chloride.

16. The process of claim 13, wherein said 1-olefin is butene-1 and said comonomer is ethylene.

17. The process of claim 12, wherein said 1-olefin main monomer is butene-1, said comonomer is ethylene, said component A is titanium trichloride, and said component B is a mixture of diethylaluminum chloride and diethylaluminum iodide.

References Cited

UNITED STATES PATENTS

| | | | |
|---|---|---|---|
| 2,837,504 | 6/1958 | Hanson et al. | 260—88.2 |
| 3,197,452 | 7/1965 | Natta et al. | 260—93.7 |
| 3,203,943 | 8/1965 | Houser | 260—94.9 |
| 3,290,278 | 12/1966 | Rice et al. | 260—3.7 |
| 3,296,232 | 1/1967 | Cleary | 260—88.2 |

FOREIGN PATENTS 607,210  10/1960  Canada.

OTHER REFERENCES

Medalia et al.: J. Poly. Sci., 41, 241–263 (1959), pp. 256 and 246 relied on.

Sittig: Polyolefin Resin Processes, 1961, pp. 41–42, TP 986 P 56 55.

JOSEPH L. SCHOFER, *Primary Examiner.*

F. L. DENSON, M. B. KURTZMAN,
*Assistant Examiners.*

UNITED STATES PATENT OFFICE
CERTIFICATE OF CORRECTION

Patent No. 3,362,940   January 9, 1968

Ralph W. Edwards et al.

It is certified that error appears in the above identified patent and that said Letters Patent are hereby corrected as shown below:

Column 3, line 38, "P-A, PI-A, and PIII" should read -- VA, VIA, and VIII --; line 47, "zorconium" should read -- zirconium --. Column 7, line 50, "as a rate" should read -- at a rate --. Column 11, line 64, "B s" should read -- B is --.

Signed and sealed this 4th day of November 1969.

(SEAL)
Attest:

Edward M. Fletcher, Jr.   WILLIAM E. SCHUYLER, JR.
Attesting Officer   Commissioner of Patents